United States Patent [19]
Tan

[11] Patent Number: 6,065,066
[45] Date of Patent: May 16, 2000

[54] SYSTEM FOR DATA STREAM PACKER AND UNPACKER INTEGRATED CIRCUIT WHICH ALIGN DATA STORED IN A TWO LEVEL LATCH

[75] Inventor: Taikhim H. Tan, San Jose, Calif.

[73] Assignee: Adaptec, Inc., Milpitas, Calif.

[21] Appl. No.: 09/089,039

[22] Filed: Jun. 2, 1998

[51] Int. Cl.[7] .................................................... G06F 13/00
[52] U.S. Cl. ................................... 710/4; 710/4; 710/52; 710/71
[58] Field of Search .................................. 710/4, 38, 52, 710/61, 71; 307/227.2, 224, 228

[56] References Cited

U.S. PATENT DOCUMENTS

| | | | |
|---|---|---|---|
| 4,901,076 | 2/1990 | Askin et al. | 341/100 |
| 4,907,187 | 3/1990 | Terada et al. | 364/900 |
| 5,172,011 | 12/1992 | Leuthold et al. | 307/272.2 |
| 5,327,543 | 7/1994 | Miura et al. | 395/375 |
| 5,423,010 | 6/1995 | Mizukami | 395/375 |
| 5,499,263 | 3/1996 | Schmit et al. | 370/112 |
| 5,625,355 | 4/1997 | Takeno et al. | 341/67 |
| 5,691,943 | 11/1997 | Yun | 365/189.05 |
| 5,768,546 | 6/1998 | Kwon | 395/307 |

OTHER PUBLICATIONS

IBM TBD Dishon et al, "Variable–length data assembler", vol. 19, No. 12, Oct. 1976, pp. 1892–1895.

*Primary Examiner*—Thomas C. Lee
*Assistant Examiner*—Chun Cao
*Attorney, Agent, or Firm*—Skjerven, Morrill, MacPherson Franklin & Friel LLP; David T. Millers; Fabio E. Marino

[57] ABSTRACT

A system is provided for packing and unpacking data being transferred between a serial network connection and a parallel system bus of a computer system. In the receive direction, this is achieved by unpacking fixed length serial data packets into a receive payload buffer. Data is then incrementally fetched from the receive payload buffer and stored in a first latch. The contents of the first latch are then transferred to a second latch, while additional fixed length serial data packets are store in the first latch. The data stored in the first and the second latch is then aligned in an aligner module depending on an address offset in a host computer memory and stored in an unpacker module. Variable length data is then retrieved from the unpacker module and stored in the host computer memory. In the send direction, this is achieved by aligning and packing variable length data transferred into a send payload buffer. Variable length data is first stored in a first latch. The contents of the first latch are then transferred to a second latch, while additional variable length is stored in the first latch. The data stored in the first and the second latch is then aligned in an aligner module depending on an address offset in a host computer memory and stored in a packer module. Fixed length data packets are then retrieved from the packer module and stored in a send payload buffer.

20 Claims, 14 Drawing Sheets

Microfiche Appendix Included
(1 Microfiche, 81 Pages)

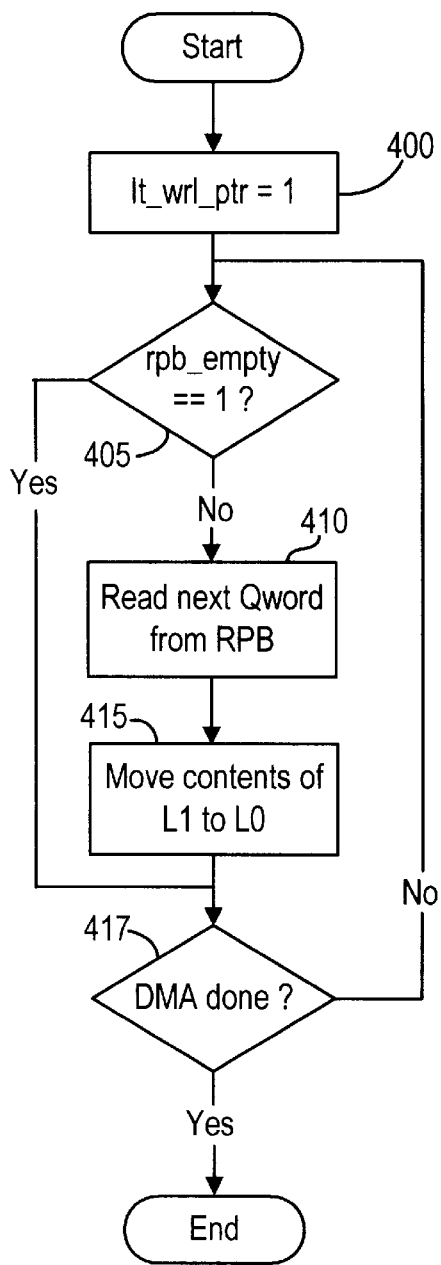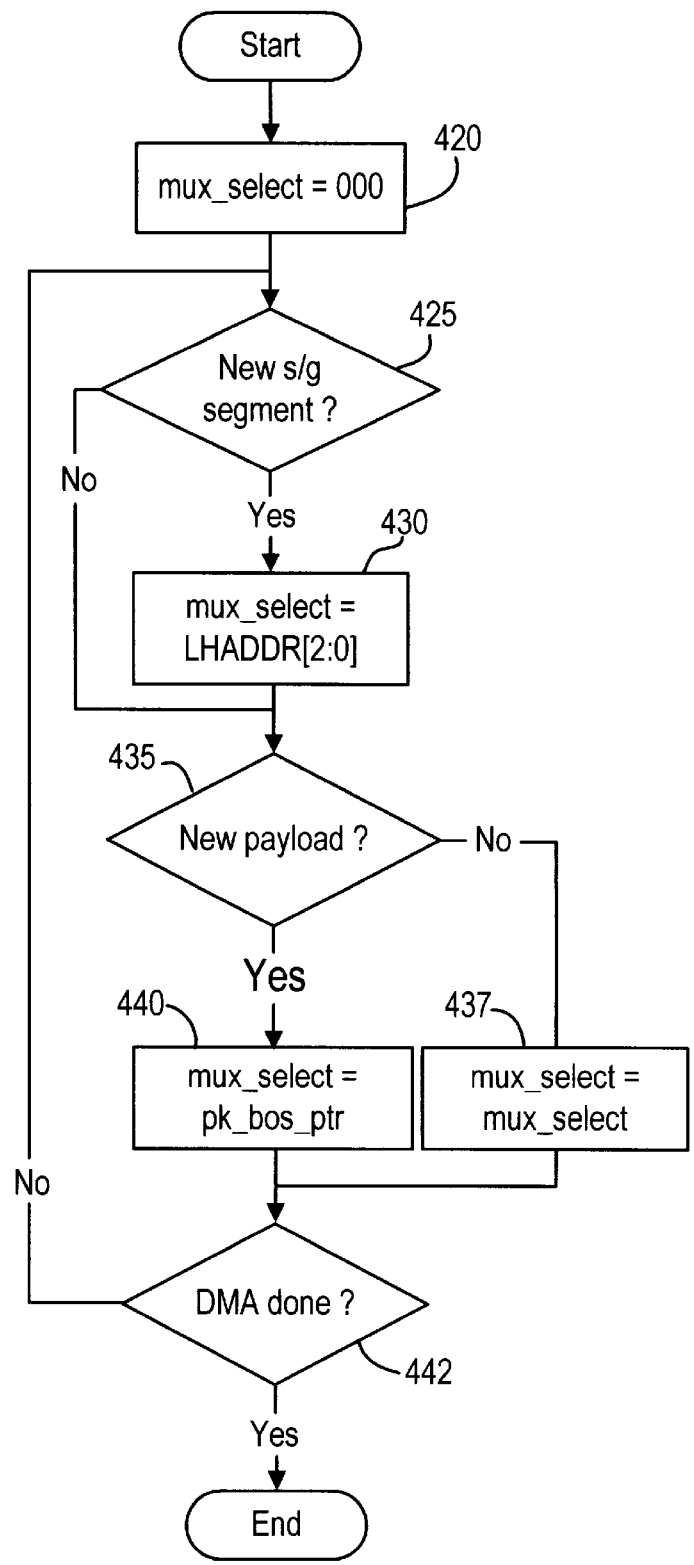
Fig. 4A
Fig. 4B

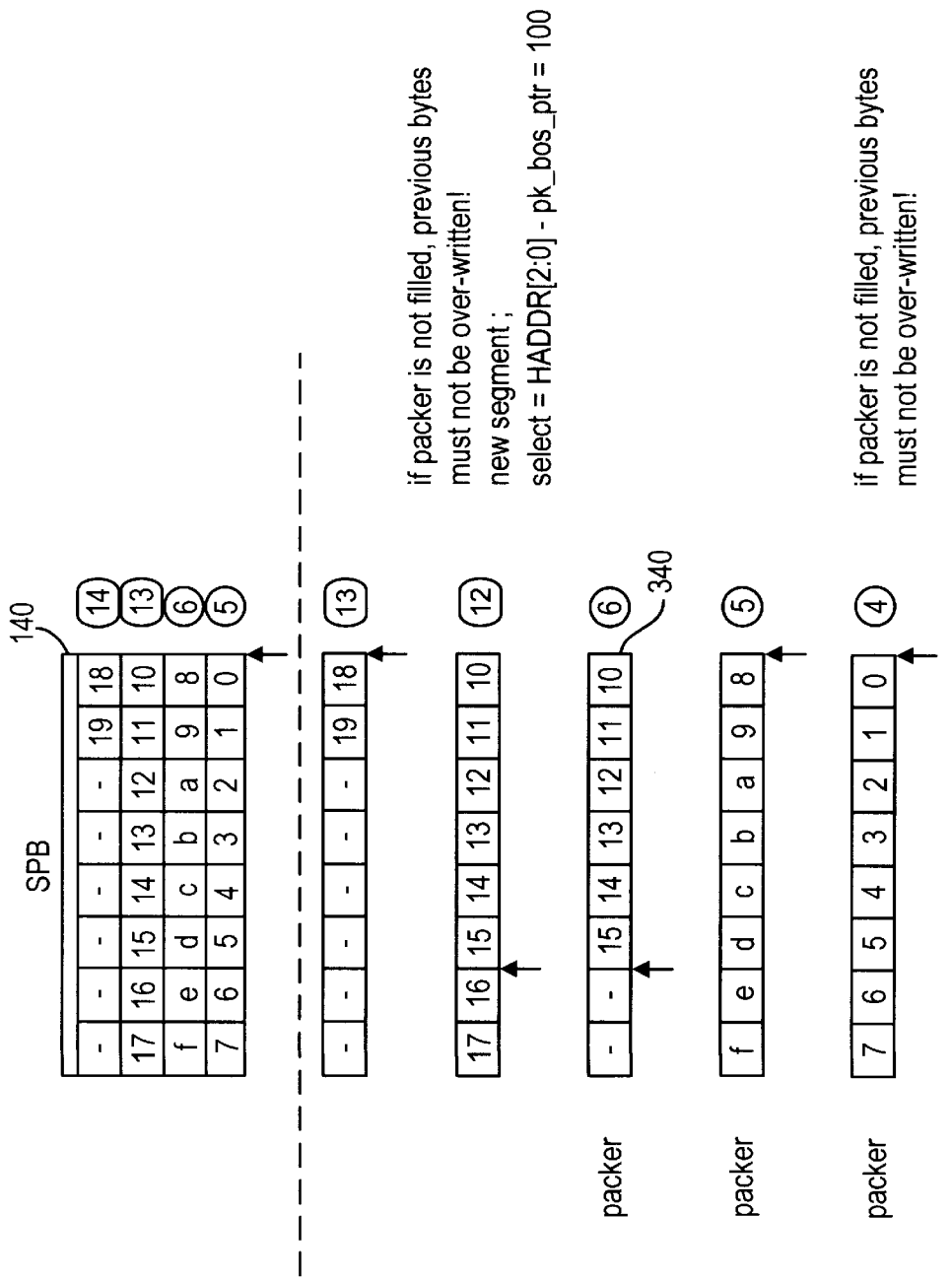

SYSTEM FOR DATA STREAM PACKER AND UNPACKER INTEGRATED CIRCUIT WHICH ALIGN DATA STORED IN A TWO LEVEL LATCH

CROSS-REFERENCE TO COPYRIGHTED MATERIALS

Appendix A is a listing of RTL code describing a packer/unpacker, circuit according to an embodiment of the invention. Appendix A contains materials which are subject to copyright protection. The copyright owner has no objection to the facsimile reproduction by anyone of the materials in Appendix A, as they appear in the Patent and Trademark Office patent file or records, but otherwise reserves all copyright rights whatsoever.

BACKGROUND OF THE INVENTION

1. Field of the Invention

The present invention relates generally to integrated circuits and, more particularly, to data pack/unpack integrated circuits.

2. Related Art

Host adapters are well known in the art. One of the functions performed by a host adapter is to permit communications between serial and parallel devices and systems. For example, data may be transferred between a serial network connection and a parallel system bus connected to a host computer. Data received from the serial network connection is subdivided in packets that have a fixed length (frames) formatted according to a particular network protocol. On the other hand, data transmitted over the parallel bus and stored in a memory of the host computer is divided into variable length data transfers. A scatter/gather table is used to record the location and length of each of the variable length segments stored in host computer memory 155. When the fixed size data segments are received over the serial network connection, the data is unpacked (i.e., the payload is extracted from each frame) and transmitted over the parallel bus to host computer memory 155. Similarly, data received over the parallel bus needs to be packed into frames for transmission over the serial network connection.

In addition, data transfer rates may vary substantially between the serial network connection and the parallel system bus. Thus, the pack/unpack operation may create a bottleneck in the performance of both the serial network connection and the parallel system bus.

There is thus a need for a host adapter that can efficiently perform packing/unpacking operations on data being transferred between a serial network connection and a parallel system bus.

SUMMARY OF THE INVENTION

A method and apparatus are provided for packing and unpacking data being transferred between a serial network connection and a parallel system bus of a computer system.

In the receive direction (i.e. from the network to the bus), this is achieved by unpacking fixed length serial data packets received by a serial network connection into a receive payload buffer. Data is then incrementally fetched from the receive payload buffer and stored in a first latch. The contents of the first latch are then transferred to a second latch, while additional fixed length serial data packets are stored in the first latch. The data stored in the first and the second latch is then aligned in an aligner module depending on an address offset in a host computer memory and stored in an unpacker module. Variable length data is then retrieved from the unpacker module and stored in the host computer memory via a PCI bus.

In the send direction (i.e., from the bus to the network), this is achieved by aligning and packing variable length data transferred over the PCI bus into a send payload buffer prior to transmitting the data over a serial network connection. Variable length data from the host computer memory is first transferred over the PCI bus and stored in a first latch. The contents of the first latch are then transferred into a second latch, while additional variable length data is stored in the first latch. The data stored in the first and the second latch is then aligned in an aligner module depending on an address offset in a host computer memory and stored in a packer module. Fixed length data packets are then retrieved from the packer module and stored in a send payload buffer prior to transmission over the serial network connection.

BRIEF DESCRIPTION OF THE DRAWINGS

FIG. 4A is a flow diagram describing the process of controlling which latch of the two-level latch of the unpacker circuit data is written to in the receive data path.

FIG. 4B is a flow diagram describing the process of controlling the order in which data bytes are aligned in the unpacker circuit in the receive data path.

DETAILED DESCRIPTION OF THE PREFERRED EMBODIMENTS

Figure 1A:
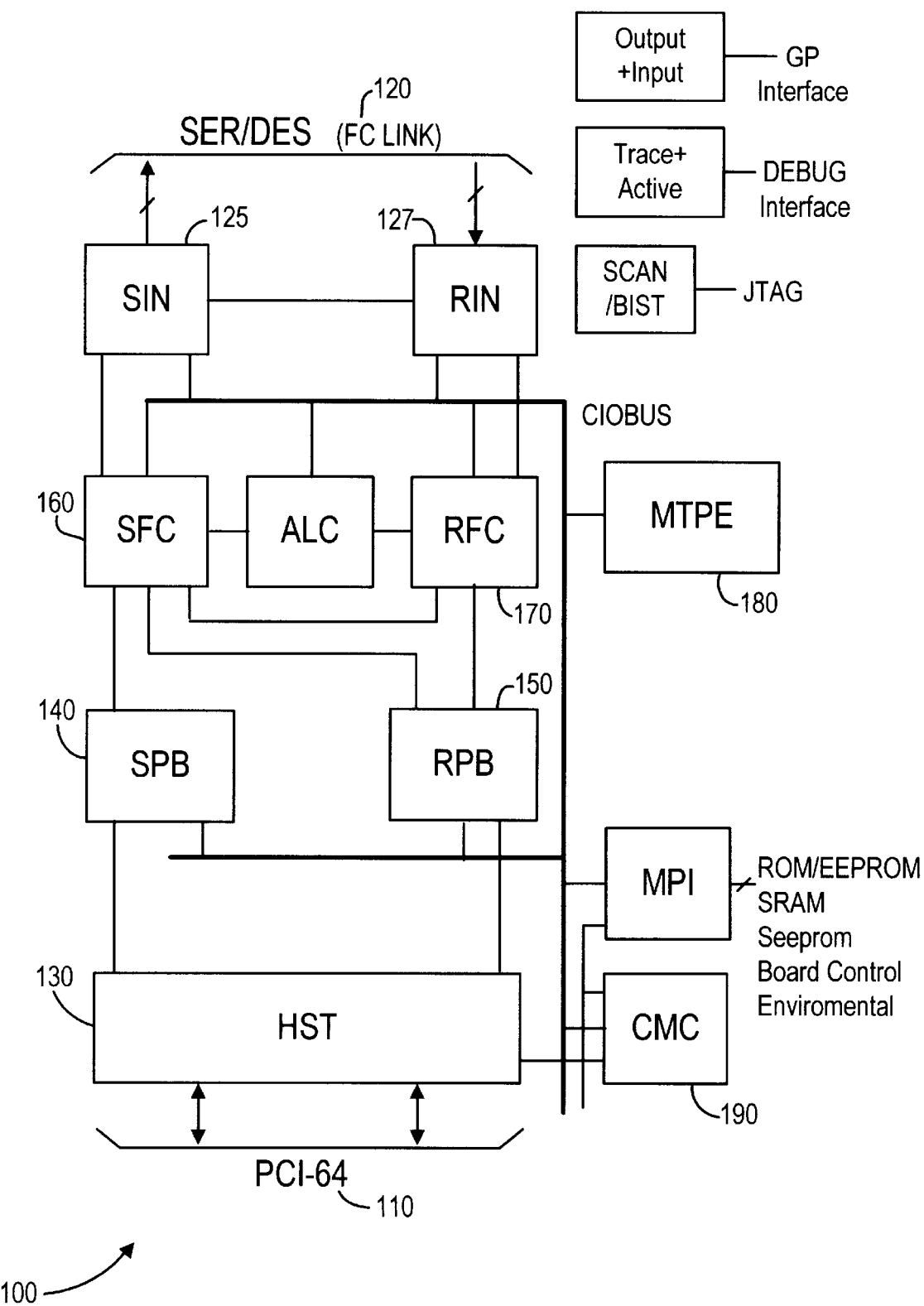
FIG. 1A is a block diagram of a host adapter integrated circuit, according to an embodiment of the invention.
Figure 1B:
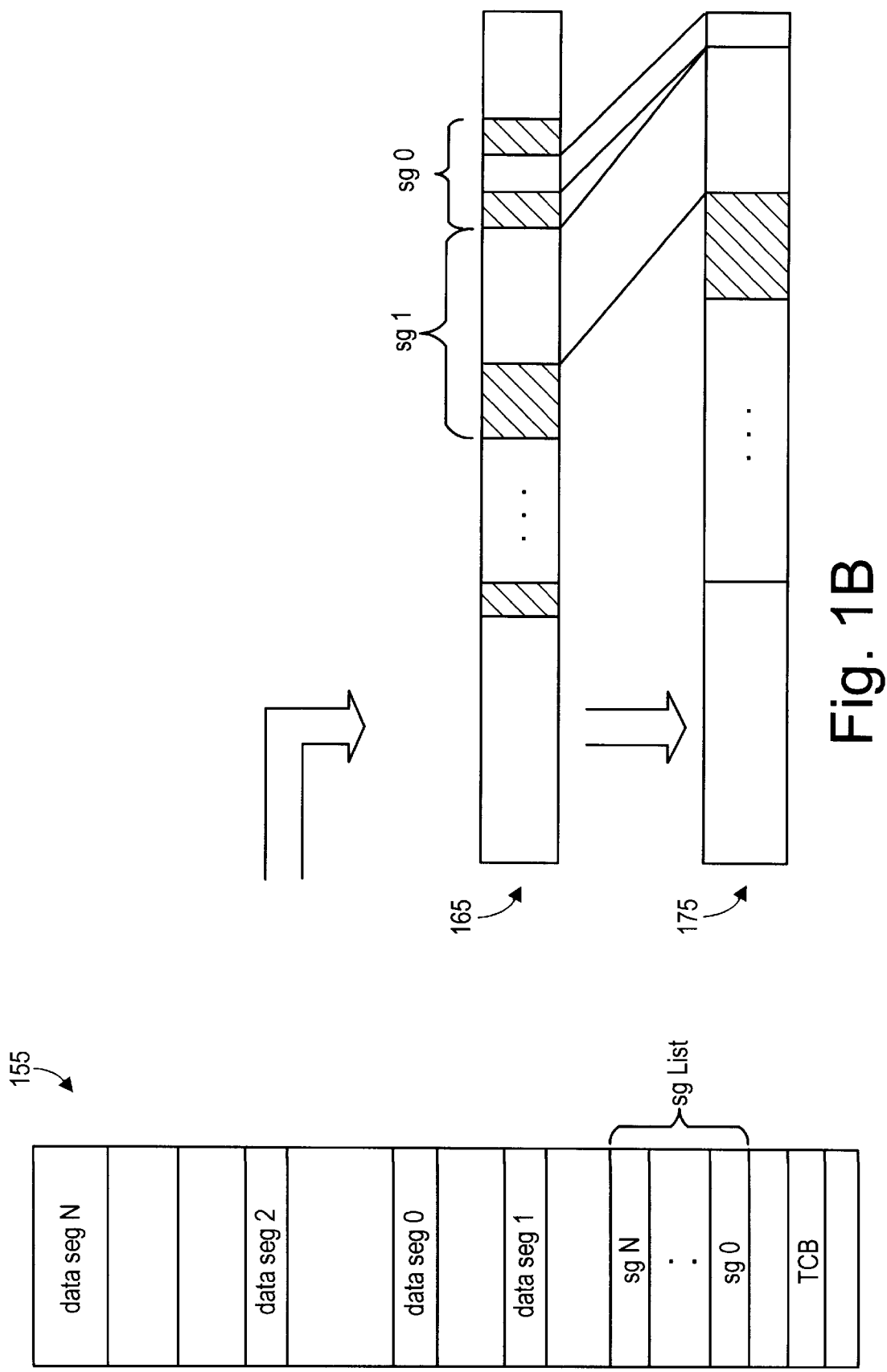
FIG. 1B shows the data flow from host computer memory 155 to the FC link.

A host adapter 100 according to an embodiment of the invention is shown in FIG. 1A. The host adapter performs Fibre Channel (FC) I/O operations which actually result in data being transferred between the memory of a host computer and a remote device connected to the Fibre Channel serial link. Data transfers between the host adapter and the host system memory are performed over the PCI bus via direct memory access (DMA). Multi-Tasking Processing Engine (MTPE) 180 is a RISC processor that controls data transfers in response to a Transfer Control Block (TCB) received from the host computer and stored in Command Control Module (CMC) 190. As illustrated in FIG. 1B, the data segments to be transferred for I/O operations are defined by scatter/gather (s/g) elements. Each s/g element specifies a starting address and a length of a variable length data segment in host computer memory 155. The s/g elements are linked together in an s/g list. The pointer to the s/g list is found in a TCB. Since each s/g element requires a PCI DMA, multiple DMAs may be required to transfer a data segment over the PCI bus.

In FIG. 1A, host adapter 100 is connected on one side to a Fibre Channel (FC) link 120 and on the other side to a PCI bus 110. FC link 120 interfaces with pack/unpack circuit 100 via Send Interface (SIN) 125 and Receive Interface (RIN) 127. In the send datapath, data received from PCI bus 110 is packed by host (HST) module 130 and stored into Send Payload Buffer (SPB) 140. Send Frame Control 160 then transfers the frames stored in SPB 140 to FC link 120 through Send Interface (SIN) 125. In the receive data path, data received from FC link 120 is transferred through RIN 127 to Receive Frame Control (RFC) module 170. RFC 170 extracts the payload from the frame and stores the payload in a Receive Payload Buffer (RPB) 150. Host (HST) module 130, reads data stored in RPB 150, unpacks the data and transfers the data over PCI bus 110 to a memory of the host computer.

In the FC send direction, data from the host system memory is byte-aligned to compensate for PCI address offsets prior to transmission over the FC link. In addition, the data alignment scheme used for FC datastream 175 can be different from the byte alignment scheme used for PCI datastream 165. A PCI 64-bit bus is used to connect the packer to host computer memory 155. A 64-bit PCI bus supports both 64-bit operations and 32-bit operations and the address offset is defined by the s/g list. Each element of the s/g list contains a DMA address and a DMA count (HCNT). A DMA address (HADDR) is represented by the notation [HHADDR, LHADDR] (High DMA Address, Low DMA Address). HCNT represents the number of bytes transferred by the DMA. On the other hand, FC datastream 175 is always aligned with a starting offset of zero in SPB 140.

Furthermore, when several scatter/gather segments are transmitted over the FC link, data from one or more scatter/gather segments of PCI datastream 165 may need to be combined in one or more FC frames of FC datastream 175. For example, if the length of an s/g segment (which is variable) exceeds the space available in the current FC frame, a portion of the s/g segment is packed in the next FC frame. As a result, the packer must be able to temporarily store the data to be transmitted over the FC link.

In the FC receive direction, the data received over the FC link is unpacked prior to transferring to the host system memory based upon the address offset for each s/g element.

Therefore, packing and unpacking of the data are required to extract contiguous data segments for transmission over the FC link and for subdividing the data received over the FC link into different segments of the host system memory.

Figure 2A:
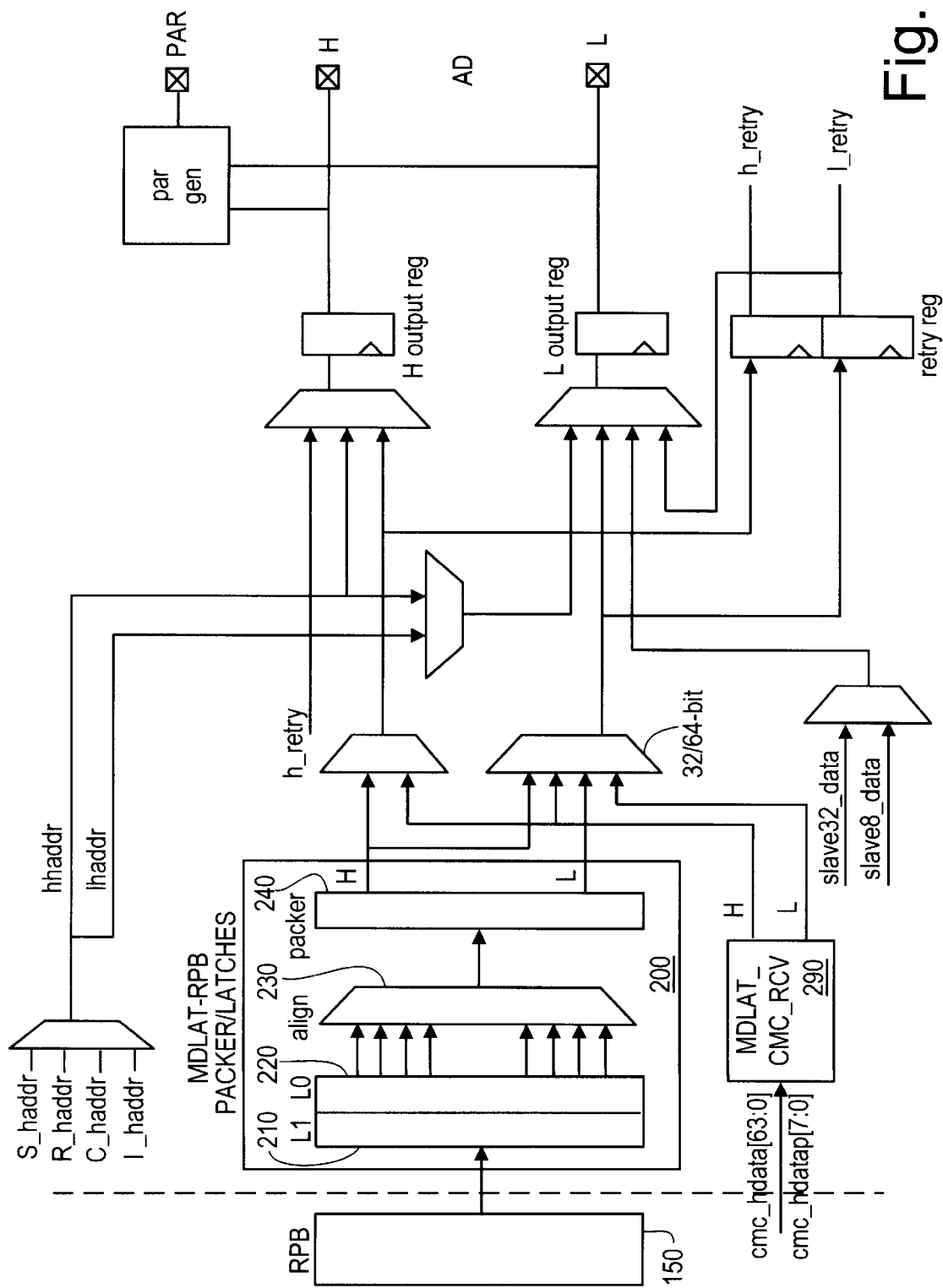
FIG. 2A is a block diagram of the receive datapath of an unpacker circuit, according to an embodiment of the invention.
Figure 3A:
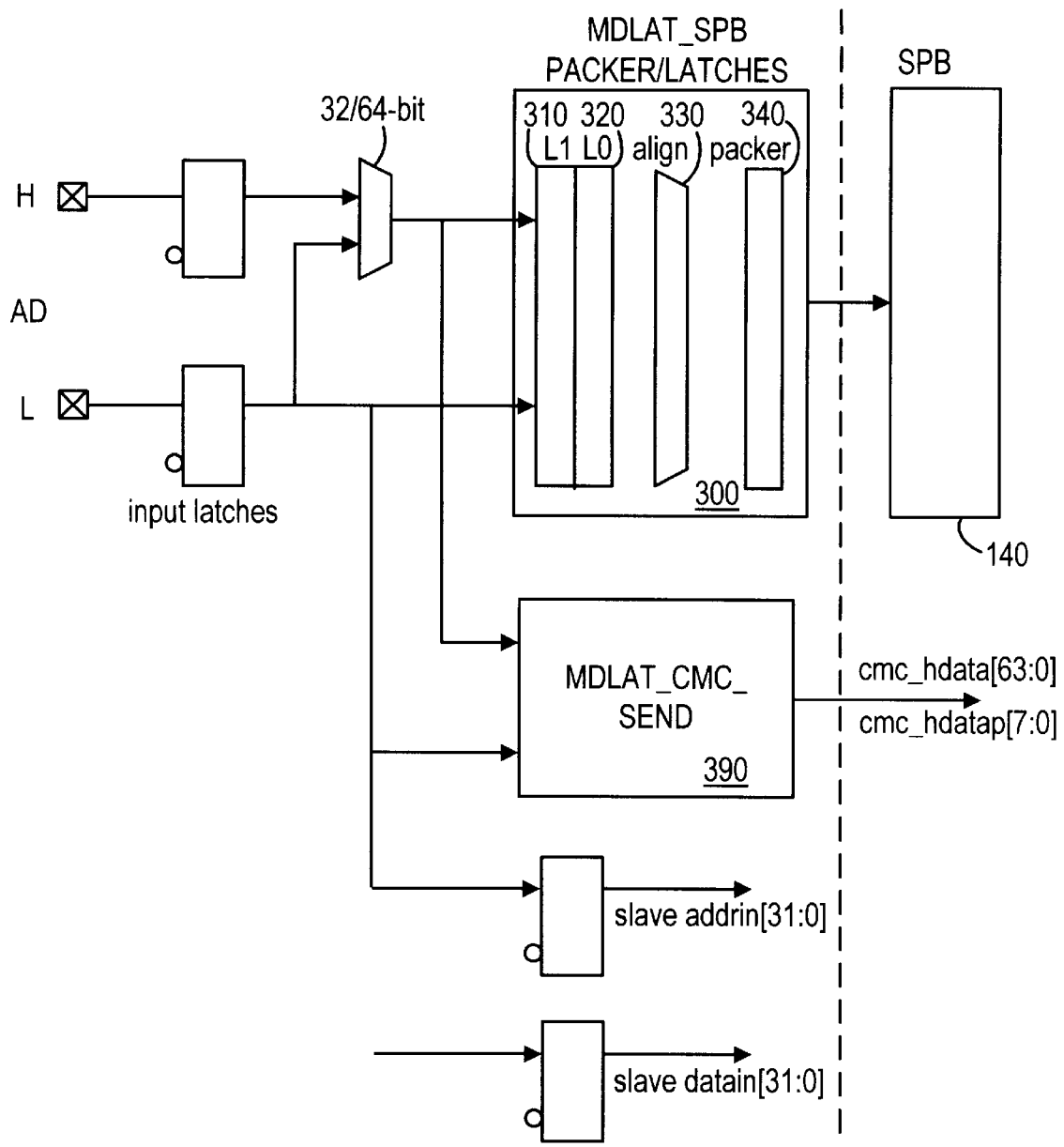
FIG. 3A is a block diagram of the send datapath of a packer circuit, according to an embodiment of the invention.

FIG. 2A illustrates the components in the receive datapath of unpacker circuit 200 of HST module 150 (FIG. 1A). FIG. 3A illustrates the components in the send datapath of packer circuit 300 of HST module 140. As used herein, the receive direction refers to reading from RPB 150 (Receive Payload Buffer) and the send direction refers to writing to SPB 140 (Send Payload Buffer).

Unpacker circuit 200 includes L1 latch 210, L0 latch 220, aligner module 230 and unpacker module 240. In the receive direction, the payloads of frames received over FC link 120 are initially stored in RPB 150. RPB 150 is a storage device such as an SRAM, a DRAM or an SDRAM. The storage space of RPB 150 is subdivided in 9 pages, each page having a storage capacity of 512 bytes for a total of 4.5k bytes. Serial data packets received over FC 120 are first unpacked into RPB 150. Data is then incrementally fetched from the RPB 150 and stored in L1 latch 210 one Qword (e.g., 64 bits) at a time. The Qword stored in L1 latch 210 is then transferred to L0 latch 220, while a second Qword of the variable length data segments is stored in L1 latch 210. A Qword is then extracted from L1 latch 210 and L0 latch 220, aligned in aligner module 230 based on the address offset specified by the s/g element and stored in unpacker module 240. Depending on the address offset and the length of the data segment of host computer memory 155 specified by the s/g element, the aligned Qword may be retrieved entirely from L1 latch 210, L0 latch 220 or from both L1 latch 210 and L0 latch 220. Variable length data segments are then retrieved from unpacker module 240 and stored in host computer memory 155 via a PCI bus 120. A set of multiplexers is used to control the amount of data transferred out of packer module 240, depending on whether PCI bus 110 allows for 32-bit or 64-bit PCI operations.

Packer circuit 300 includes L1 latch 310, L0 latch 320, aligner module 330 and packer module 340. A variable length data (up to one Qword in length) from host computer memory 155 is first transferred over PCI bus 110 and stored in L1 latch 310. The contents of L1 latch 310 are then transferred into L0 latch 320, while additional data (either from the same variable length data segment or from a new variable length data segment) is stored in L1 latch 310. The data stored in L1 latch 310 and L0 latch 320 is then aligned in aligner module 330 depending on an address offset in host computer memory 155 and stored in packer module 340. When packer module 340 is filled (or the last s/g segment has been packed) the Qword stored in packer module 340 is stored in SPB 140. Fixed length serial data packets are then extracted from SPB 140 and transmitted over FC link 120. SPB 140 is also subdivided into 9 pages of 512 bytes each.

The control signals used to control the packer in the receive direction are shown in Table 1 below.

TABLE 1

| Register | BitB | Description |
| --- | --- | --- |
| lt_wrl_ptr | 1 | Latch write line pointer: indicates which line, 1 or 0, of the RPB data will be written into. |
| mux_select | 3 | Alignment mux selection: selects the byte alignment path for each byte line |
| pk_bos_ptr | 3 | Packer byte offset pointer: indicates the next byte location where the latch line data will be written or packed into. |

Figure 2B:
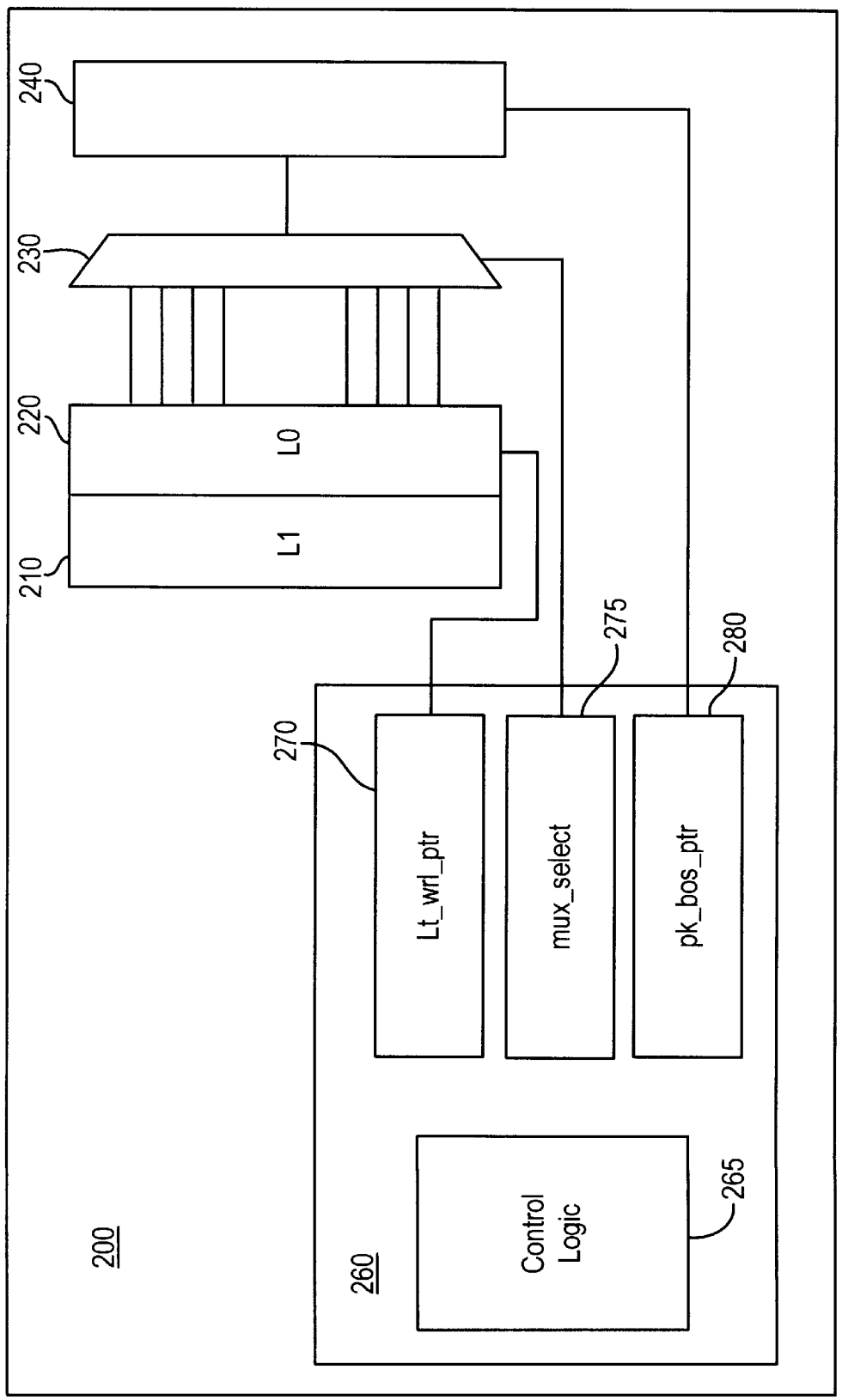
FIG. 2B shows a control module of the unpacker circuit of FIG. 2A.
Figure 3B:
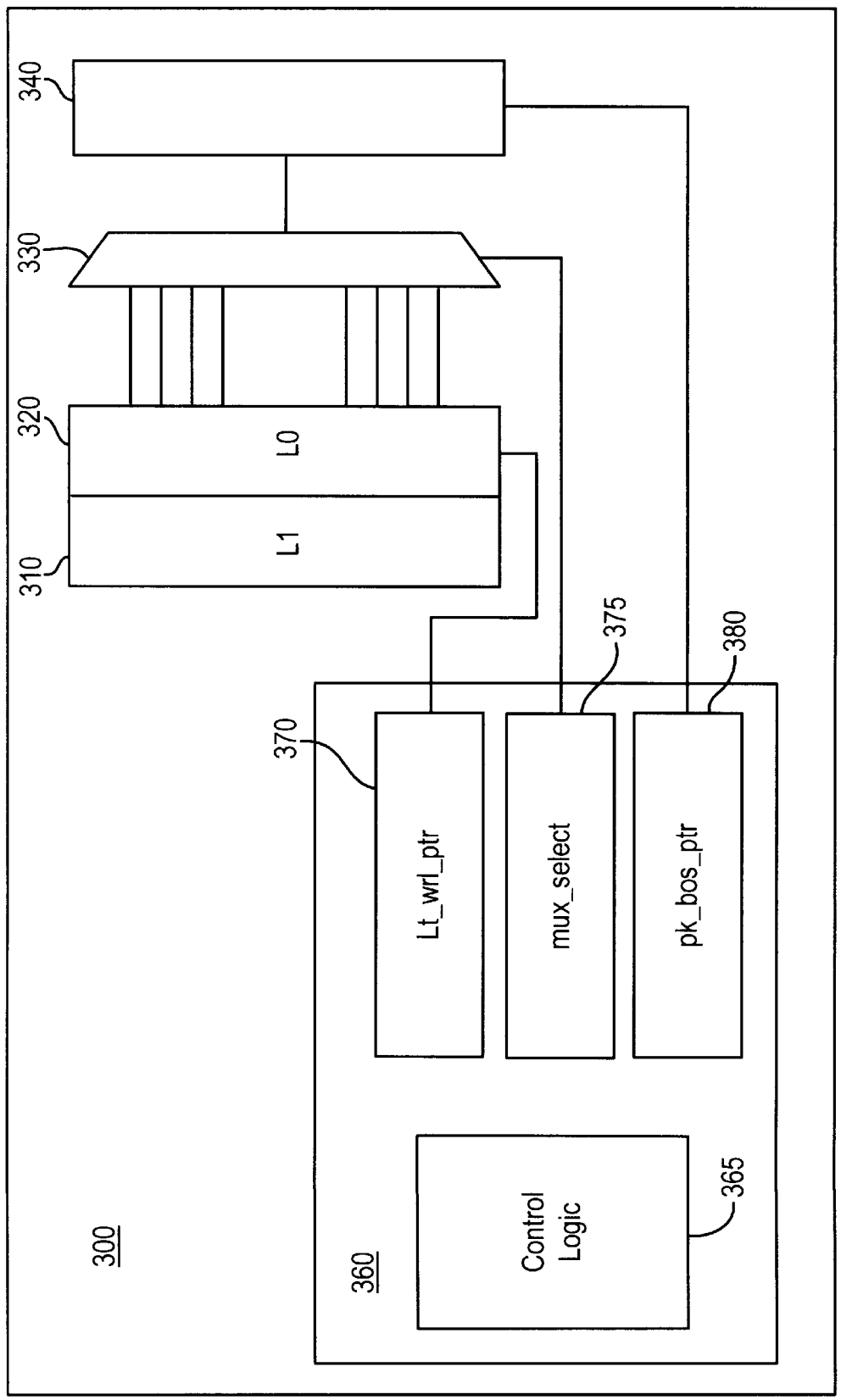
FIG. 3B shows a control module of the packer circuit of FIG. 3A.

The control signals in Table 1 are generated by control logic modules of MDLAT_RPB unpacker circuit 200 and MDLAT_SPB packer circuit 300, as shown in FIGS. 2B and 3B.

Furthermore, MDLAT_CMC_RCV unpacker circuit 290 (FIG. 2A) and MDLAT_CMC_SEND packer circuit 390 (FIG. 3A) are identical in construction to of MDLAT_RPB unpacker circuit 200 and MDLAT_SPB packer circuit 300. Accordingly, when multiple DMA channels are provided by the host adapter, 2 sets of control modules can be provided in both the send and receive datapaths with minimal modification of the hardware shown in FIGS. 2A–2B and 3A–3B. For example, data can be multiplexed between the identical sets of control modules when a DMA channel switch is detected. As a result, no data latency is introduced in the event DMA channels are switched.

In the Receive direction, a Qword (i.e., 64 bits) is always read into the next available latch line. Upon DMA enable, the write latch line pointer is always initialized to point to latch line L1 (the latch closer to the RPB). Meanwhile, a packer byte-pointer is also set to the current LHADDR offset (i.e., if LHADDR is 02h, the packer byte-pointer is pointing to byte 2). The LHADDR (Low Host Address) offset is part of the scatter/gather element. Subsequent data coming into the packer must be packed next to the last byte written. A 3-bit rpb_rb_cnt signal (RPB valid byte count of the current line) is used to determine how many bytes will be packed and the location of the packer byte-pointer for the next data transfer from the line to the packer. A value of 000 implies that all 8 bytes are valid. In addition, HCNT is monitored to determine when the current scatter/gather element DMA has completed. Then, the next element's LHADDR and HCNT can be set.

FIG. 4A illustrates a latch line update operation, in the receive direction. First, in stage 400, lt_wrl_ptr is initialized to 1 to direct data read from RPB 150 to L1 latch 210. Stage 405 then determines if there is still data in RPB 150 to be packed (rpb_empty 1), in which case the next block of data is retrieved from RPB 150 in stage 410. Otherwise stage 400 is repeated to start processing of the next s/g segment until all s/g segments have been processed. In stage 415, the data stored in L1 latch 210 is moved into L0 latch 220. Stage 417 then determines whether the current s/g element DMA is completed, in which case the operation terminates. Otherwise, stages 405–417 are repeated until all data stored in RPB 150 has been stored into host computer memory 155.

As a result, the first read from RPB always fills line 1 and subsequent reads fill L1 while the previous line is pushed into L0.

FIG. 4B illustrates the process of controlling aligner module 230 (FIG. 2A) in the receive datapath via control signal mux_select. The mux_select control signal is first initialized to 000 in stage 420. Stage 425 then determines whether a new s/g segment is being processed, in which case the operation proceeds to stage 430. In stage 430, the mux select control signal is set equal to the 3 least significant bits (LSBs) of LHADDR (low host address of the current s/g element DMA, representing the offset of the received data. Stage 435 then determines whether the data is for a new payload, in which case the operation proceeds to stage 440. Otherwise, the value of the mux_select control signal remains unchanged in stage 437. In stage 440, control signal mux_select is set equal to pk_bos_ptr. Stage 442 then determines whether the current s/g element DMA is completed, in which case the operation terminates. Otherwise, stages 425–442 are repeated until the DMA is completed.

The byte alignment paths used by aligner module 230 to multiplex the data read from L1 latch 210 and L0 latch 220 according to the value of control signal mux_select is described in Table 2 below.

TABLE 2

| mux_select | b7 | b6 | b5 | b4 | b3 | b2 | b1 | b0 |
|---|---|---|---|---|---|---|---|---|
| 000 | L1.7 | L1.6 | L1.5 | L1.4 | L1.3 | L1.2 | L1.1 | L1.0 |
| 001 | L1.6 | L1.5 | L1.4 | L1.3 | L1.2 | L1.1 | L1.0 | L0.7 |
| 010 | L1.5 | L1.4 | L1.3 | L1.2 | L1.1 | L1.0 | L0.7 | L0.6 |
| 011 | L1.4 | L1.3 | L1.2 | L1.1 | L1.0 | L0.7 | L0.6 | L0.5 |
| 100 | L1.3 | L1.2 | L1.1 | L1.0 | L0.7 | L0.6 | L0.5 | L0.4 |
| 101 | L1.2 | L1.1 | L1.0 | L0.7 | L0.6 | L0.5 | L0.4 | L0.3 |
| 110 | L1.1 | L1.0 | L0.7 | L0.6 | L0.5 | L0.4 | L0.3 | L0.2 |
| 111 | L1.0 | L0.7 | L0.6 | L0.5 | L0.4 | L0.3 | L0.2 | L0.1 |

Each column in Table 2 represents a byte lane of packer module 240. The rows represent the possible values of the mux_select command signal. The value of each entry in Table 2, therefore, represents the source of the byte lane data (e.g., L1.2 means Latch Line 1 byte 2). For example, when mux_select==010, packer byte 0 is derived from Line 0 byte 6.

Figure 4C:
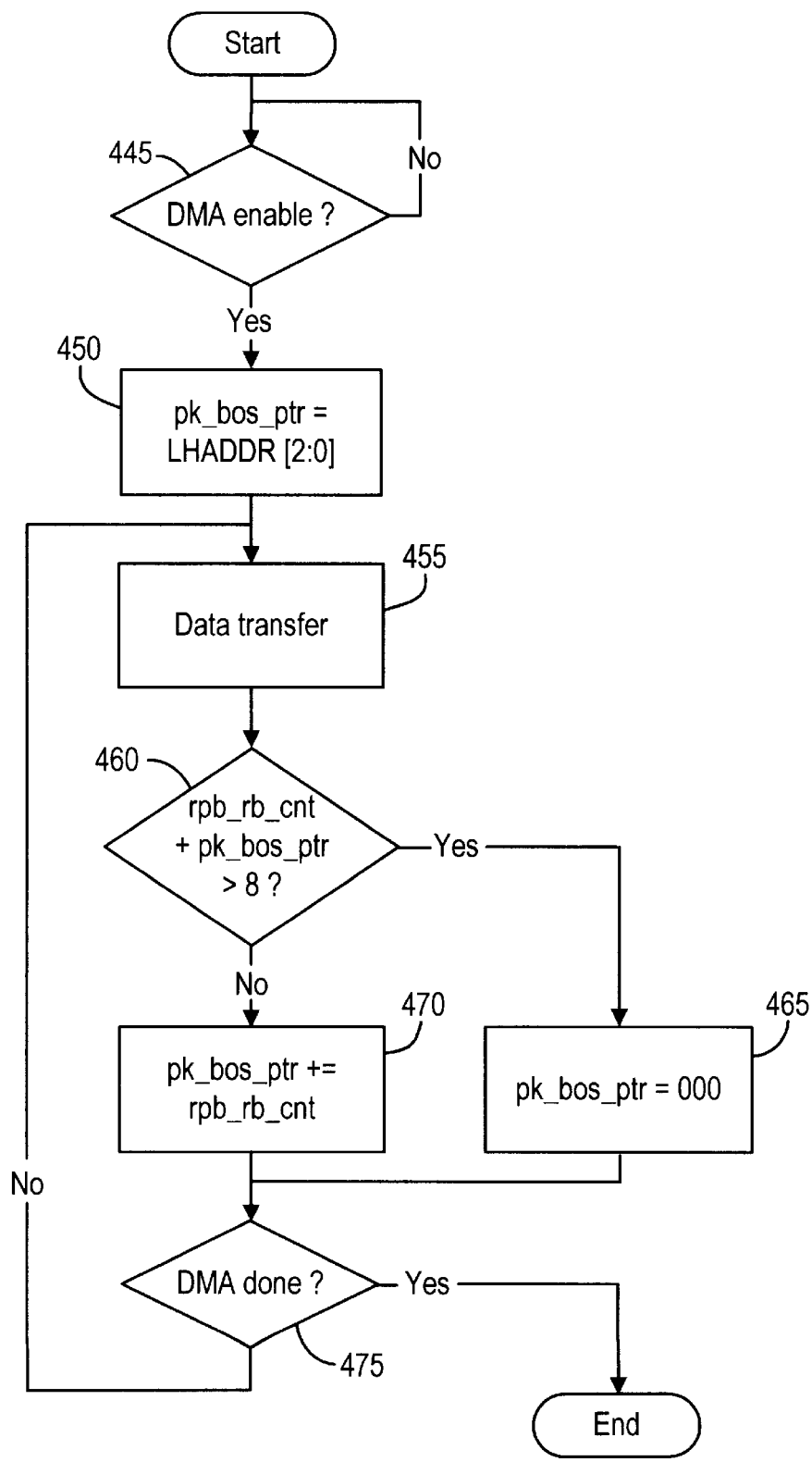
FIG. 4C is a flow diagram describing the process of controlling transfer data pointers in the unpacker circuit in the receive data path.

FIG. 4C illustrates a packer byte offset pointer determination operation. First, stage 445 determines whether a DMA is enabled, in which case the operation proceeds to stage 450. Otherwise, stage 445 is repeated until a DMA enable is detected. In stage 450, pk_bos_ptr is set to a value equal to the 3 LSBs of LHADDR. A single data transfer takes place in stage 455. Stage 460 determines whether the packer is filled (rpb_rb_cnt+pk_bos_ptr>8), in which case the operation proceeds to stage 465. Otherwise, the operation proceeds to stage 470. In stage 470, pk_bos_ptr is incremented by the value of the rpb_rb_cnt. In stage 465, pk_bos_ptr is reset to 000. Finally, stage 475 determines whether the current s/g element DMA is completed, in which case the operation terminates. Otherwise, stage 445–475 are repeated until the DMA is completed.

In the event of a context switch and rpb_empty==1, the values stored in packer/unpacker module 200 are flushed.

In the Send direction, incoming PCI data is latched into L1 latch 310 even if only partial bytes are valid. Upon DMA enable, the write latch line pointer is initialized to point to L1 latch 310 (the line closer to the PCI bus). Data bytes are aligned as needed based upon the HADDR (Host Address). Since the very first byte is packed in byte line 0 of SPB 140 (FIG. 3A), the packer byte pointer is initialized to 0. Subsequent data coming into packer module 340 is then packed next to the last byte written. The number of bytes transferred from L1 latch 310 and L0 latch 320 into packer module 340 is used to determine a packer byte pointer value (pk_bos_ptr). The last packer byte pointer value is stored so that subsequent scatter/gather segments can continue from the byte location next to the last written packer byte data. When packer module 340 is filled, the Qword stored in the packer module 340 is written into SPB 140. In the case of the last s/g segment, MPTE sets a last segment indicator register bit to indicate that the last s/g segment is being sent, so that the data stored in L0 latch 320 is sent even though packer module 340 may not be filled.

Figure 5A:
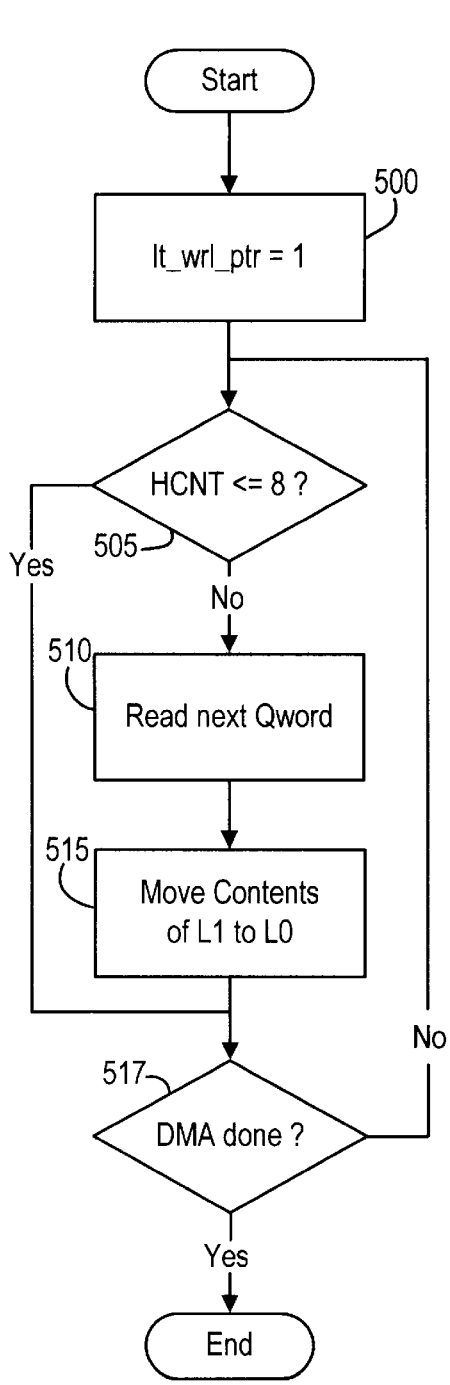
FIG. 5A is a flow diagram describing the process of controlling which latch of the two-level latch of the packer circuit is written to in the send data path.

FIG. 5A illustrates a latch line update operation in the send direction. First, lt_wrl_ptr is initialized to 1 to select L1 latch 310 (FIG. 3A) in stage 500. Then stage 505 determines whether the DMA count has expired (HCNT<= 8), in which case the operation proceeds to stage 517. Otherwise, the next Qword is read in stage 510. The contents of L1 latch 310 are then transferred to L0 latch 320 in stage 515, to allow a new Qword to be read into L1 latch 310. Stage 517 then determines whether all the data transferred from host computer memory 155 during the current DMA has been sent, in which case the operation terminates. Otherwise, stage 505–517 are repeated until all data in the current DMA has been stored in SPB 140.

Figure 5B:
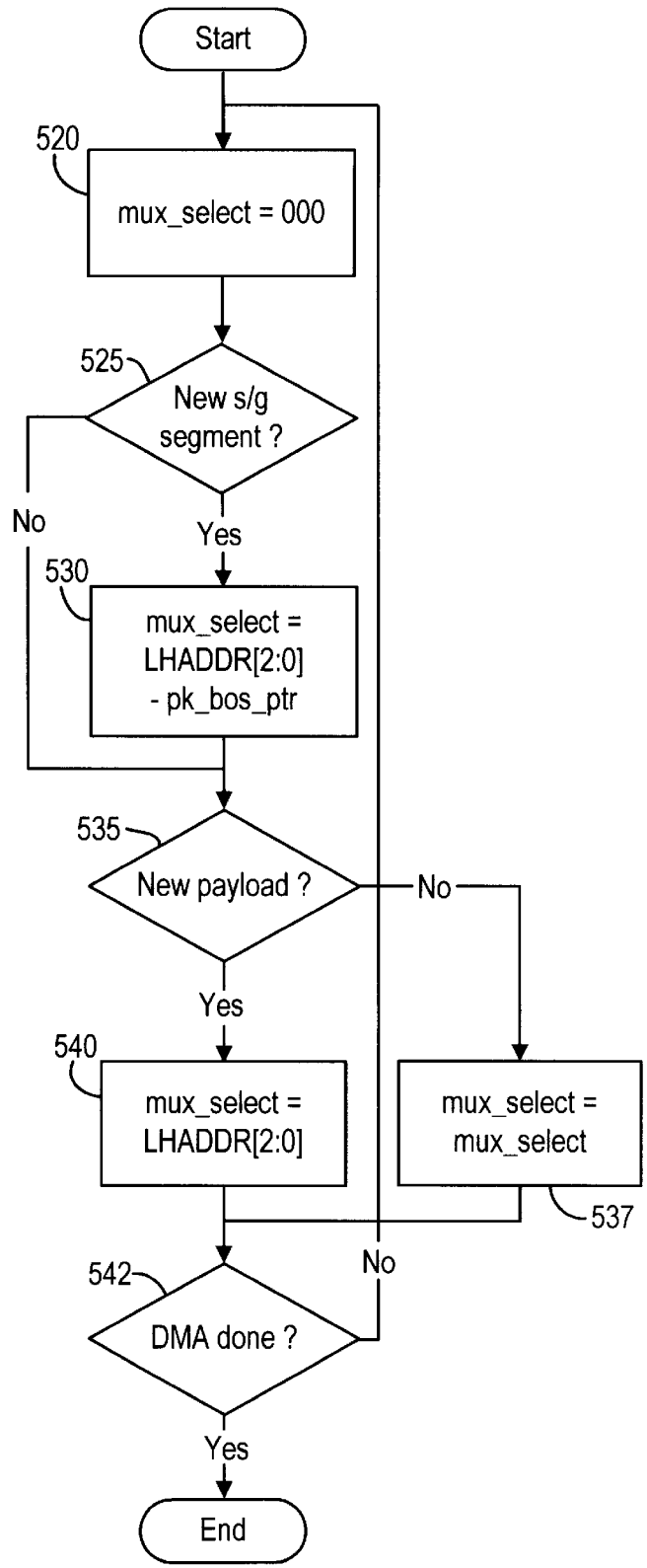
FIG. 5B is a flow diagram describing the process of controlling the order in which bits are aligned in the packer circuit in the send data path.

FIG. 5B illustrates the process of controlling aligner module 330 (FIG. 3A) in the send datapath via control signal mux_select.

First, control signal mux_select is initialized to 000 in stage 520. Then, stage 525 determines whether a new s/g segment is being processed, in which case the operation proceeds to stage 530. In stage 530, control signal mux_select is set equal to the value of the 3 LSBs of LHADDR minus the value of pk_bos_ptr. Stage 535 then determines whether a new payload has been received, in which case the operation proceeds to stage 540. Otherwise, the value of control signal mux_select remains unchanged in stage 537. In stage 540, control signal mux_select is set to the value of the 3 LSBs of LHADDR. Finally, stage 542 determines whether all the data received from host computer memory 155 during the current DMA has been sent, in which case the operation terminates. Otherwise, stages 520–542 are repeated until all data in the current DMA has been stored in SPB 140.

The byte alignment paths used by aligner module 330 to multiplex the data read from L0 latch 320 according to the value of control signal mux_select is described in Table 3 below.

TABLE 3

| mux_select | b7 | b6 | b5 | b4 | b3 | b2 | b1 | b0 |
|---|---|---|---|---|---|---|---|---|
| 000 | L0.7 | L0.6 | L0.5 | L0.4 | L0.3 | L0.2 | L0.1 | L0.0 |
| 001 | L1.0 | L0.7 | L0.6 | L0.5 | L0.4 | L0.3 | L0.2 | L0.1 |
| 010 | L1.1 | L1.0 | L0.7 | L0.6 | L0.5 | L0.4 | L0.3 | L0.2 |
| 011 | L1.2 | L1.1 | L1.0 | L0.7 | L0.6 | L0.5 | L0.4 | L0.3 |
| 100 | L1.3 | L1.2 | L1.1 | L1.0 | L0.7 | L0.6 | L0.5 | L0.4 |
| 101 | L1.4 | L1.3 | L1.2 | L1.1 | L1.0 | L0.7 | L0.6 | L0.5 |
| 110 | L1.5 | L1.4 | L1.3 | L1.2 | L1.1 | L1.0 | L0.7 | L0.6 |
| 111 | L1.6 | L1.5 | L1.4 | L1.3 | L1.2 | L1.1 | L10 | L0.7 |

Each column in Table 3 represents a byte lane of packer module 340. The rows represent the possible values of the mux_select command signal. The value of each entry in Table 3, therefore, represents the source of the byte lane data (e.g., L2.1 means Line 2 byte 1). For example, when mux_select==001, byte 4 is derived from Line 0 byte 5.

Figure 5C:
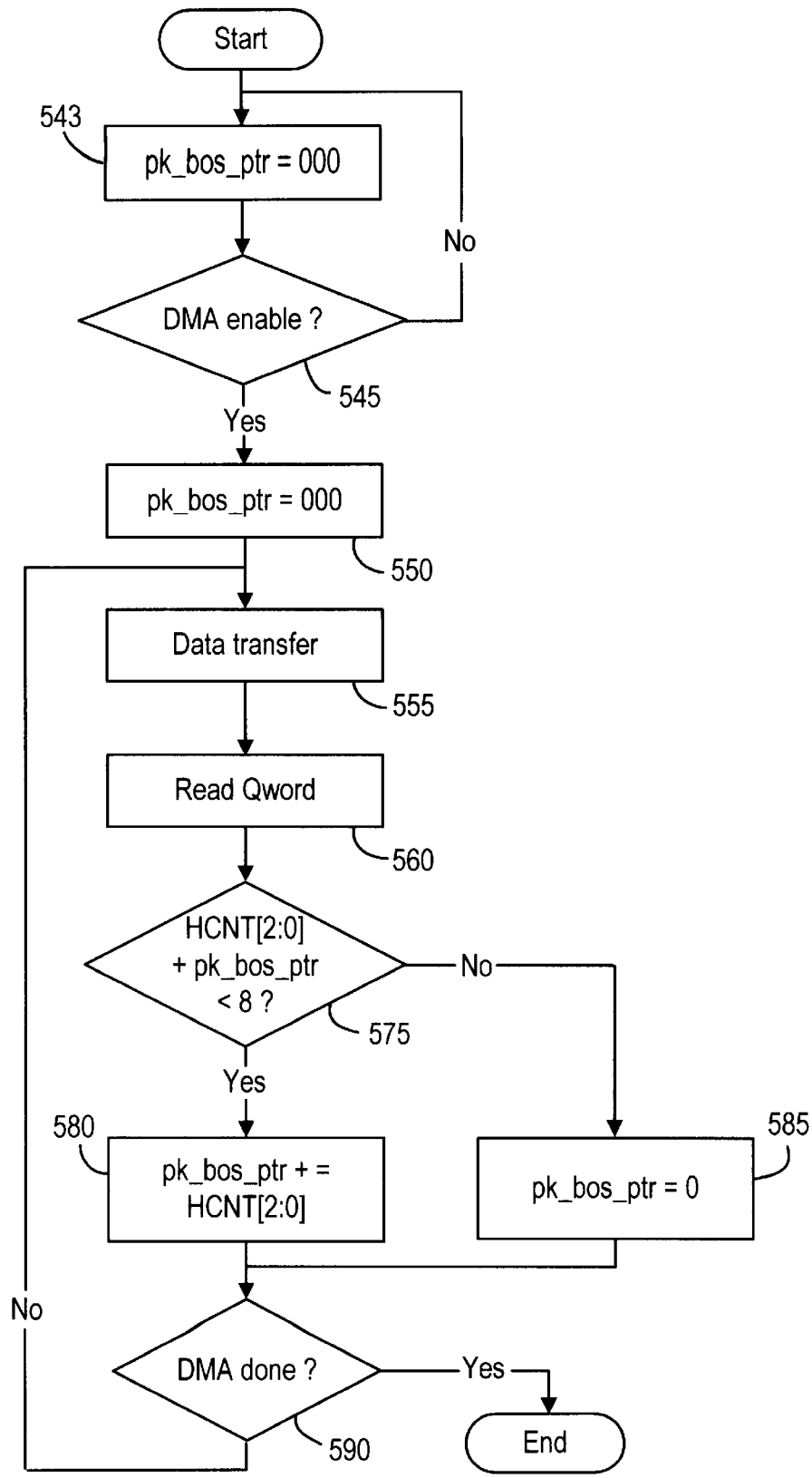
FIG. 5C is a flow diagram describing the process of controlling transfer data pointers in the packer circuit in the send data path.

FIG. 5C illustrates a packer byte offset pointer determination operation. First, pk_bos_ptr is set to 000 in stage 543. Stage 545 then determines whether a DMA enable flag is set to indicate a transfer of data from host computer memory 155, in which case the operation proceeds to stage 550. Otherwise, stages 543–545 are repeated until a DMA is enabled. In stage 550, pk_bos_ptr is again set to 000. A single data transfer then takes place in stage 555. A Qword is then read in stage 560. Stage 575 determines whether the value of the 3 LSBs of HCNT plus the value of pk_bos_ptr is less than 8, in which case the operation proceeds to stage 580. Otherwise the operation proceeds to stage 585. In stage 580, pk_bos_ptr is incremented by the value of the 3 LSBs of HCNT. Stage 585 clears the value of pk_bos_ptr to 000. Finally stage 590 determines whether the DMA is complete, in which case the operation terminates. Otherwise, stages 555–590 are repeated until all data in the DMA transfer has been stored in SPB 140.

In the event that the current segment does not fill up the entire packer line, the value of pk_bos_ptr is saved for appending the data of the next scatter/gather element.

Figure 6A:
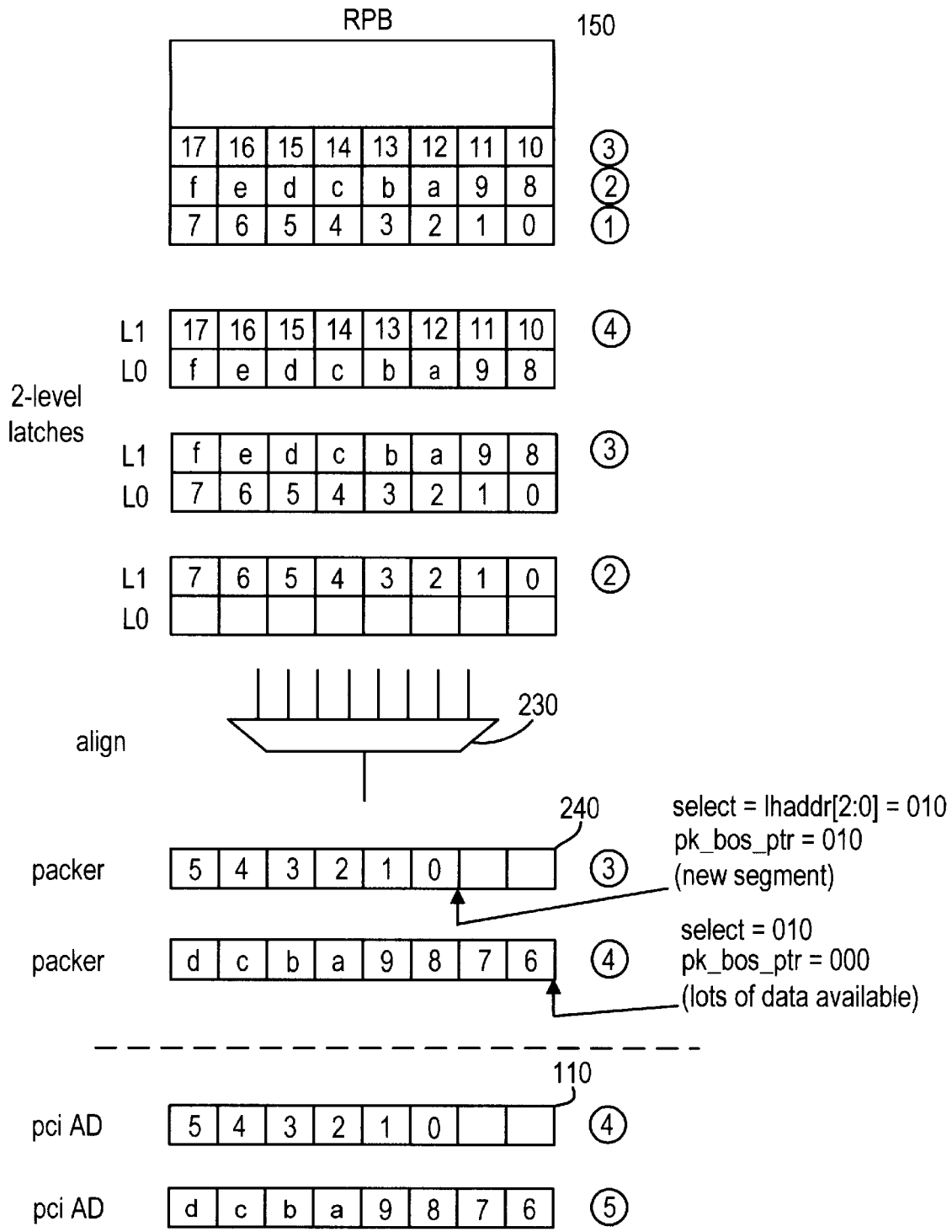
FIGS. 6A–6B illustrate the flow of data through the unpacker circuit in the receive direction, according to an embodiment of the invention.
Figure 6B:
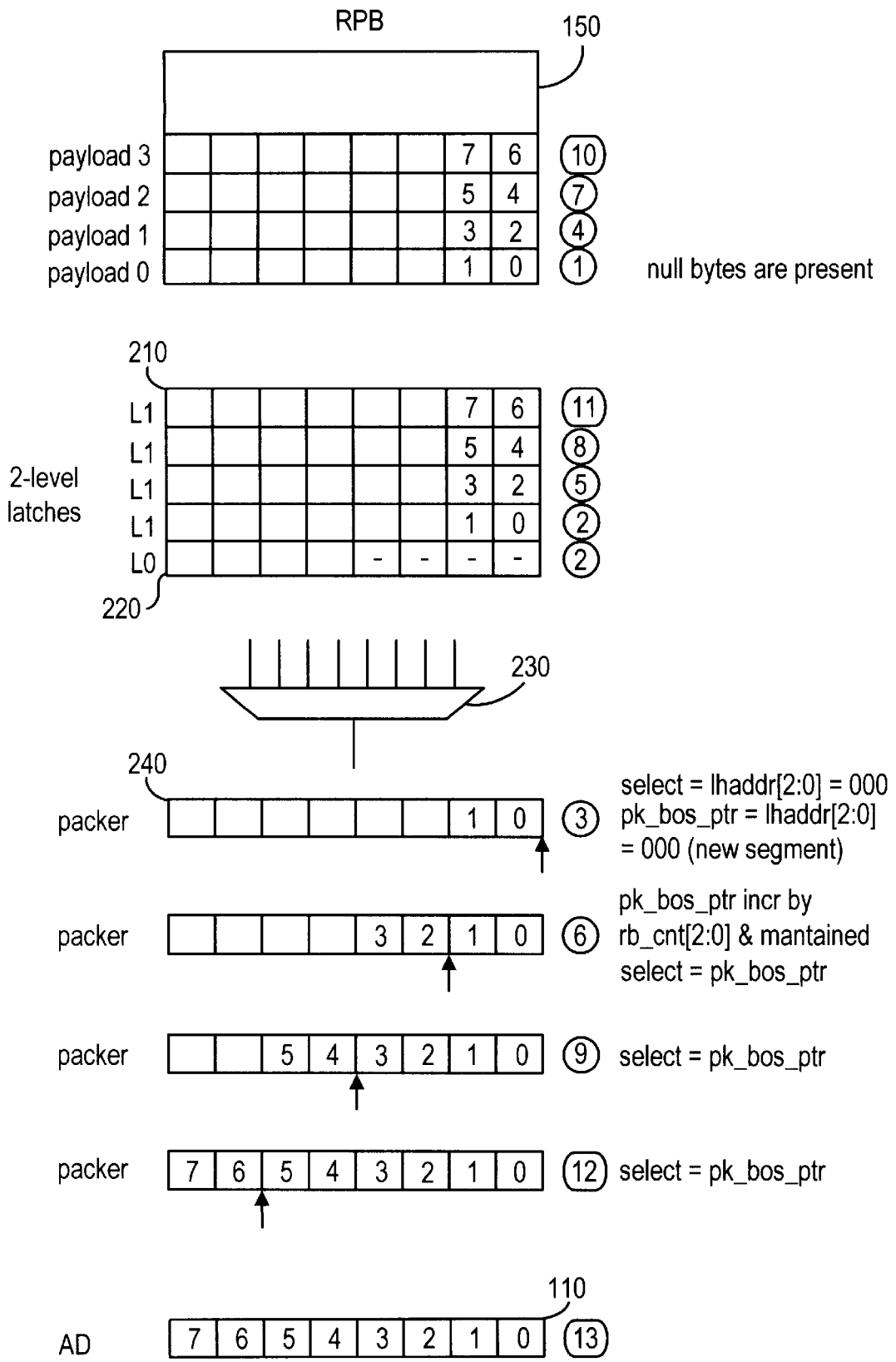

Examples of receive (FIGS. 6A–6B) operations using a pack/unpack circuit according to an embodiment of the invention are shown in FIGS. 6A–6B.

FIG. 6A illustrates how the contents of RPB 150 are latched, aligned and unpacked prior to being transmitted over PCI bus 110. The diagram shows the contents of L1 latch 210, L0 latch 220 and packer module 240 at successive time points (clock edges). A time point is defined as one or more PCI bus clock edges. The time point or more precisely, the rising clock edge, at which each set of data is stored in any of the devices in FIG. 6A is indicated by a circle shown next to the block diagram of each device. Data transfers occur only at a clock edge. In other words, moving data from a source to a destination means that the source data must be available before the occurrence of the clock edge (i.e., the source data must be available in the source at time 2 to be stored into the destination at time 3). The terms time and edge are used interchangeably herein. Time values are successive such that time 1 precedes time 2, which in turn precedes time 3, etc.

RPB 150, at time 0, contains data byte values of 0 to 17 (hexadecimal) but at different Qword locations in the buffer. Only one Qword can be read at each clock edge. Once the current Qword has been read, the next Qword can then be read.

At time 1, a data set of 0-7 is read from RPB 150 and stored into L1 latch 210. The storing occurs at the clock edge and hence, at time 2, L1 latch 210 holds the values 0-7. Since RPB 150 has been read, the next set of data, 8-f, is read at time 2. Data set 0-7 can no longer be read from RPB 150.

At time 3, unpacker module 240 is loaded with a data set of 0-5 in byte lanes 7-2. This is achieved with a pk_bos_ptr value of 010 (2 binary) as the LHADDR address offset is 2. The data set of 0-5 is extracted from L1 latch 210 by controlling aligner module 230 with a mux_select value of 010 (Table 2). Also at time 3, data set 0-7 from L1 latch 210 is moved to L0 latch 220 and, at the same time, a new data set 8-f is read from RPB 150 and stored into L1 latch 210. Hence, L0 latch 220 and L1 latch 210 hold data sets 0-7 and 8-f, respectively, and RPB 150 holds a data set 10-17 that can be accessed at time 3.

At time 4, data set 0-5 is directly presented on the PCI bus 110. Packer 240 is then filled with data set 6-d extracted from byte lanes of L1 latch 210 and L0 latch 220 (Table 2) with a mux_select value of 010. The pk_bos_ptr value is cleared to 000 since there are more than 8 bytes of data to be transferred to host memory 155. Also at time 4, a data set of 10-17 is stored in L1 latch 210 and a data set of 8-f is stored in L0 latch 220. RPB 150 is now empty. At time 5, data set 6-d is directly presented on the PCI bus 110 and is then transferred to host memory 155. Similar steps are then repeated until the operation is completed.

FIG. 6B illustrates a further example of a receive operation in which multiple payloads are packed for a single s/g element DMA.

In FIG. 6B, data sets of 0-1, 2-3, 4-5, 6-7 are stored in different RPB 150 buffer pages as they are extracted from different FC frame payloads. To simplify the diagram, these payloads are shown in a single block but are made available at different times (to allow switching of buffer pages). In this operation, payload is transferred in a single s/g element DMA.

At time 1, data set 0-1 is read from RPB 150 and stored in L1 latch 210 at time 2. Prior to time 3, pk_bos_ptr is also initialized with a value of 0 (derived from LHADDR). At time 3, unpacker module 240 is loaded with data set 0-1 extracted from L1 latch 210 by controlling aligner module 230 with a mux select value of 000 since LHADDR is 0 or 000 for an address offset of 0. Pk_bos_ptr is then incremented by the value of rb_cnt to 2. This is done to ensure that the next data set for unpacker module 240 is written from byte lane 2 onwards.

At time 4, RPB 150 presents the next payload with data set of 2-3. This is read into L1 latch 210 at time 5. At time 6, unpacker module 240 is loaded with data set 2-3 from L1 latch 210 by controlling aligner module 230 with a mux_select value of 010 since pk_bos_ptr is 2. Pk_bos_ptr is then incremented by the value of rb_cnt to 4. This is done to ensure that the next data set for unpacker module 240 is written from byte line 4 onwards.

This operation is repeated until all bytes have been stored into unpacker module 240 at time 12. At time 13, the values stored in unpacker module 240 are directly presented onto the PCI bus 110 and are then transferred to host memory 155.

Figure 7B:
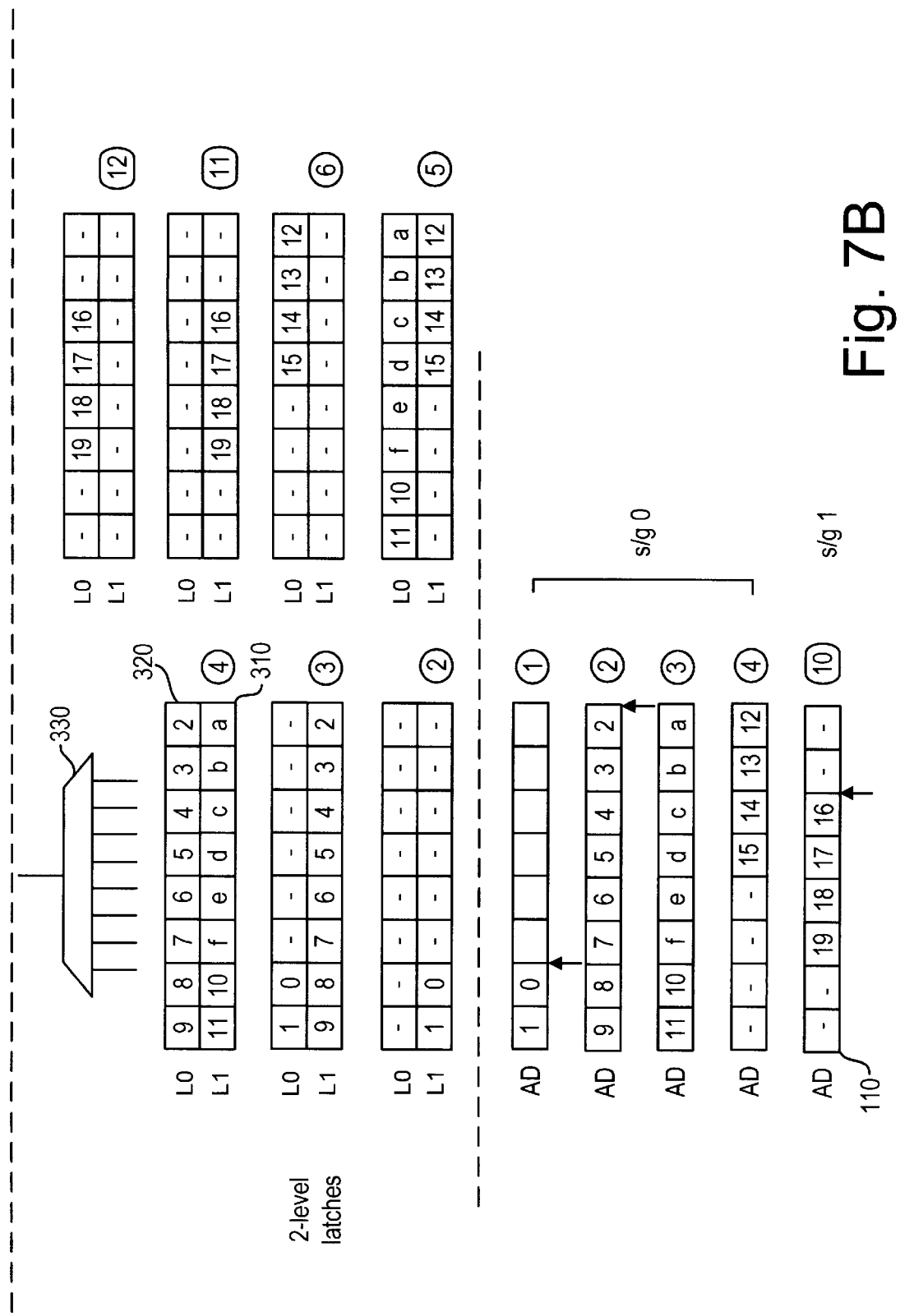
FIG. 7 illustrates the flow of data through the packer circuit in the send direction, according to an embodiment of the invention.

An example of a send operation using a pack/unpack circuit according to an embodiment of the invention is shown in FIG. 7.

In FIG. 7, two DMA data segments are packed into SPB 140. The first DMA has a starting address offset of 6 and the second has an offset of 3. There is also a time lapse between DMA segment data transfers.

At time 1, data set 0-1 appears on the PCI bus 110 at an offset of 6. This data set is moved into L1 latch 310 at time 3. Also at time 3, a new data set of 2-9 appears on PCI bus 110. At time 3, L1 latch 310 data set 0-1 is moved into L0 latch 320. At this time or prior to this (DMA enable), pk_bos_ptr is set to 000 as the first SPB 140 data is always aligned to byte line 0. Also at time 3, a new data set of a-11 appears on the PCI bus 110.

At time 4, the packer module 340 is loaded with a data set of 0-7 which extracted from L1 latch 310 and L0 latch 320 by controlling aligner module 330 with a mux_select value of 010 (LHADDR-pk_bos_ptr=6-0=6 or 110), as shown in table Table 3. Since the number of packer data bytes filled (derived from HCNT) is 8, the pk_bos_ptr is kept intact at 0. Also at time 4, L1 latch 310 data set 2-9 is moved into L0 latch 320 while L1 latch 310 then gets a new data set of a-11. Again a new data set 12-15 appears on the PCI bus 110 at time 4.

At time 5, the content of packer module 340 data set 0-7 is written into SPB 140 and packer module 340 is then loaded with a data set of 8-f extracted from L1 latch 310 and L0 latch 320 by controlling aligner module 330 with a mux_select value of 010 (since the same segment is still being processed). The value of pk_bos_ptr remains 0. Also at time 5, L1 latch 310 data set a-11 is moved into L0 latch 320 while a new data set of 12-15 is stored in L1 latch 310.

At time 6, the content of packer module 340, data set 8-f, is written into SPB 140 and packer module 340 is loaded with a data set of 10-15 extracted from L1 latch 310 and L0 latch 320 by controlling aligner module 330 with a mux_select value of 010 (since the same segment is still being processed). This time, the number of packer data bytes filled (derived from HCNT) is 6 and the value of pk_bos_ptr is increment to 6 (pk bos_ptr+HCNT=0+6=6).

After a time lapse to start processing the next DMA segment, at time 10, a new data set 16-19 appears on PCI bus 110 with an offset of 2. Mux_select value is set to 100 (LHADDR-pk_bos_ptr=2-6=4) since a new segment is now being processed. The subtraction is performed with a borrow from binary 1000 yielding as a result a positive number, 4. At time 11, a data set of 16-19 is stored in byte lines 2-5 of L1 latch 310. At time 12, packer module 340 is loaded with a data set of 16-17 appended to the existing bytes. The new data set is extracted from L1 latch 310 by controlling aligner module 330 with a mux_select value of 100 (see Table 3). The value of pk_bos_ptr is then cleared to 000 as the number of packer data bytes filled is 8. Also at time 12, data set 16-19 stored in L1 latch 310 is moved into L0 latch 320. At time 13, the contents of packer module 340, data set 10-17, are written into SPB 140 and data set 18-19 (part of L0 latch 320) is moved into packer module 340 by controlling aligner module 330 with a mux_select value of 100. At this point, the last segment has been processed and the DMA count (HCNT) expires. SPB 140 then notifies SFC 160 of the availability of new data for FC link transmission.

Embodiments described above illustrate but do not limit the invention. In particular, the invention is not limited by any particular hardware implementation. Other hardware configurations known in the art can be used in place of those described herein. For example, a system bus other than a PCI bus can be used in place of PCI bus 110. Furthermore, a serial communication link other than a Fibre Channel may be used in place of FC link 120. Other embodiments and variations are within the scope of the invention, as defined by the following claims.

I claim:

1. An unpacker integrated circuit comprising:
    a serial network connection receiving fixed length serial data from a network;
    a two-level latch, the two-level latch having a first and a second latch, wherein fixed length data received by the serial network connection is stored in the first latch and the data stored in the first latch is then transferred to the second latch while new data is stored in the first latch;
    an aligner module aligning data stored in the first and the second latch;
    a first unpacker module unpacking the data aligned by the aligner module into variable length data;
    a scatter/gather table recording the length and location of the variable length data; and
    a parallel bus port transmitting the variable length data over a system bus.

2. The unpacker of claim 1, further comprising a control signal module determining when the data received from the serial network connection is stored in the first or the second latch.

3. The unpacker of claim 1, further comprising a control signal module controlling the aligner module.

4. The unpacker of claim 1, further comprising a second unpacker module, data being multiplexed between the first and the second unpacker modules in the event of a DMA channel switch.

5. The unpacker of claim 1, wherein the first unpacker module further comprises a plurality of byte storage elements and the unpacker further comprises a control signal module controlling which byte storage elements of the first unpacker module the data from the two level-latch is stored into.

6. A packer integrated circuit comprising:
    a parallel bus port receiving variable length data over a system bus;
    a two-level latch, the two-level latch having a first and a second latch, wherein variable length data received by the parallel bus port is stored in the first latch and the data stored in the first latch is then transferred to the second latch while new data is stored in the first latch;

an aligner module aligning data from the first and the second latch into the packer;

a first packer module packing the data aligned by the aligner module into fixed length data; and a serial network connection transmitting the fixed length data over a serial network connection.

7. The packer of claim 6, further comprising a control signal module determining when the data received from the serial network connection is stored in the first or the second latch.

8. The packer of claim 6, further comprising a control signal module controlling the aligner module.

9. The packer of claim 6, further comprising a second packer module, data being multiplexed between the first and the second packer modules in the event of a DMA channel switch.

10. The packer of claim 6, wherein the first packer module further comprises a plurality of byte storage elements and the packer further comprises a control signal module controlling which byte storage elements of the first packer module the data from the two level-latch is stored into.

11. A method for unpacking data, the method comprising:

receiving fixed length serial data in a serial network connection;

storing the fixed length data received by the serial network connection in a first latch of a two-level latch;

transferring the fixed length data stored in the first latch to the second latch;

aligning the data stored in the first and the second latch in a first packer module;

unpacking the data stored in the first unpacker module into variable length data in the first unpacker module; and transmitting from a parallel bus port the variable length data over a system bus.

12. The method of claim 11, further comprising determining in a control signal module when the data received from the serial network connection is stored in the first or the second latch.

13. The method of claim 11, further comprising controlling the aligner module in a control signal module.

14. The method of claim 11, further comprising multiplexing data between the first and a second unpacker modules in the event of a DMA channel switch.

15. The method of claim 11, wherein the first unpacker module further comprises a plurality of byte storage elements and the method further comprises controlling in a control signal module which byte storage elements of the first unpacker module the data from the two level-latch is stored into.

16. A method for packing data, the method comprising:

receiving in a parallel bus port variable length data from a system bus;

storing the variable length data received by the parallel bus port in a first latch of a two-level latch;

transferring the data stored in the first latch to the second latch while new data is stored in the first latch;

aligning data stored in the first and the second latch in a packer module;

packing the data into fixed length data in a packer module; and transmitting from a serial network connection fixed length serial data over a network.

17. The method of claim 16, further comprising determining in a control signal module when the data received from the serial network connection is stored in the first or the second latch.

18. The method of claim 16, further comprising controlling the aligner module in a control signal module.

19. The method of claim 16, further comprising multiplexing data between the first and a second packer modules in the event of a DMA channel switch.

20. The method of claim 16, wherein the first packer module further comprises a plurality of byte storage elements and the method further comprises controlling in a control signal module which byte storage elements of the first packer module the data from the two level-latch is stored into.

* * * * *